Figure 1:
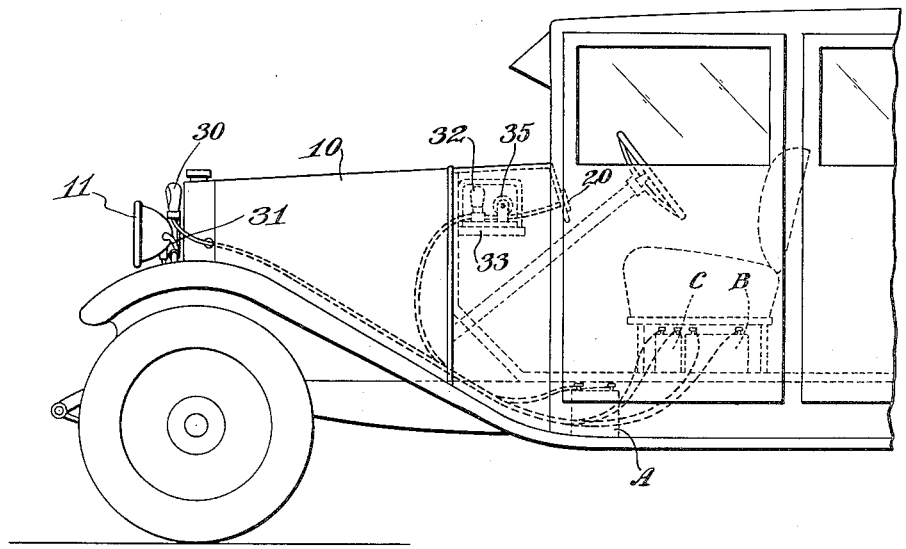

Oct. 17, 1933.   W. F. WRIGHT   1,930,497
AUTOMOBILE HEADLIGHT CONTROL
Filed April 18, 1932   2 Sheets-Sheet 1

INVENTOR:
William F. Wright
by Macleod, Calver, Copeland & Dike
Attys.

Patented Oct. 17, 1933

1,930,497

UNITED STATES PATENT OFFICE 1,930,497

AUTOMOBILE HEADLIGHT CONTROL

William F. Wright, Wellesley, Mass., assignor of one-half to Marvin E. Silberger, York, Pa.

Application April 18, 1932. Serial No. 606,064

2 Claims. (Cl. 175—312)

This invention relates to lamps for vehicles and more particularly to means for automatically dimming the lamps of a vehicle when another vehicle approaches.

Considerable inconvenience and discomfort has been experienced in the past by operators of automobiles in the night time due to the glare of the headlights of approaching vehicles. Various expedients have been suggested in the past for minimizing these difficulties, such as the provision of special non-glare lens and colored lens for the head lamps. These expedients have been ineffective or have been unsatisfactory due to their failure to throw the light in proper volume or in the proper direction upon the road bed so as to illuminate the road suitably for night driving.

It has recently been common practice to provide motor vehicles with means including a manually operable switch so that the operator may dim the headlights of his vehicle when another vehicle approaches. Even when vehicles are equipped in this manner, the operator of an approaching vehicle often neglects to dim the headlights of his vehicle and consequently causes discomfort to operators of vehicles moving in the opposite direction. Furthermore, in order to render such means practical and conveniently accessible, the switch for dimming the headlights and its associated circuits must be mounted on the steering column. This necessitates a complicated steering wheel construction.

It is the object of the present invention to provide means for automatically dimming the lamps of a vehicle when the rays from the lights of another vehicle strike them and to cause them to remain dim for a short time after they are out of the rays of the lights of the other vehicle so that they will not return to their full power and annoy the driver of a third vehicle which may be following closely behind said other vehicle.

In accordance with the present invention these difficulties are eliminated by the provision of means for dimming the headlights adapted to be actuated automatically by the lights of predetermined intensity of another vehicle when the latter approaches. When vehicles moving in opposite directions in the night time are equipped in accordance with the provisions of the invention, the headlights of both are dimmed and the operator of one vehicle is not caused inconvenience or discomfort due to the failure of the other operator to dim the lights of his vehicle. The lights of each of the vehicles remain dim for a few seconds in order to avoid any annoyance to drivers of vehicles which might be following closely behind either.

Figure 2:
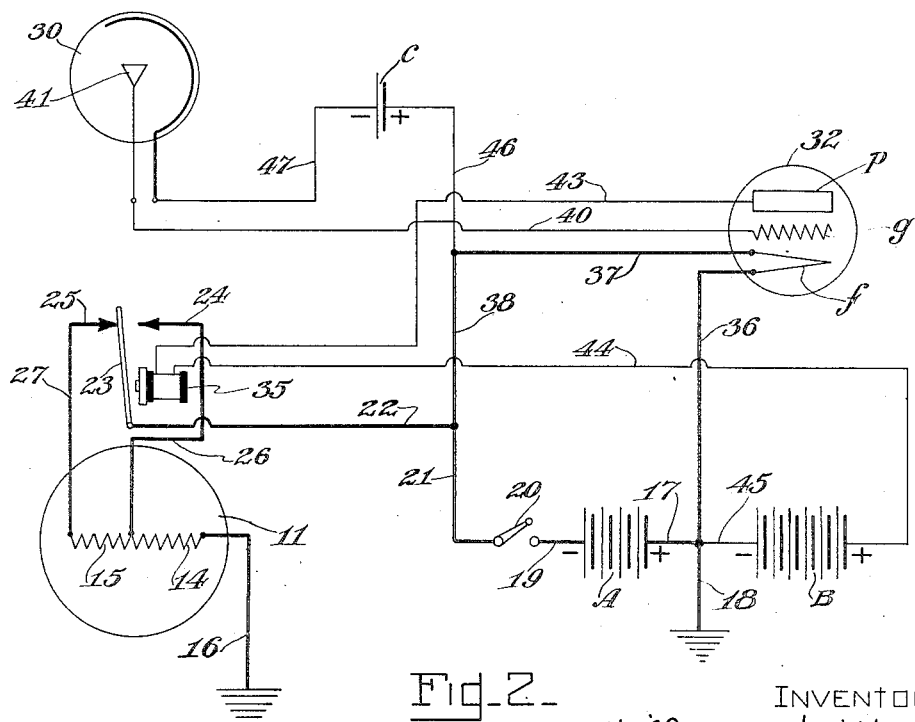
Figure 3:
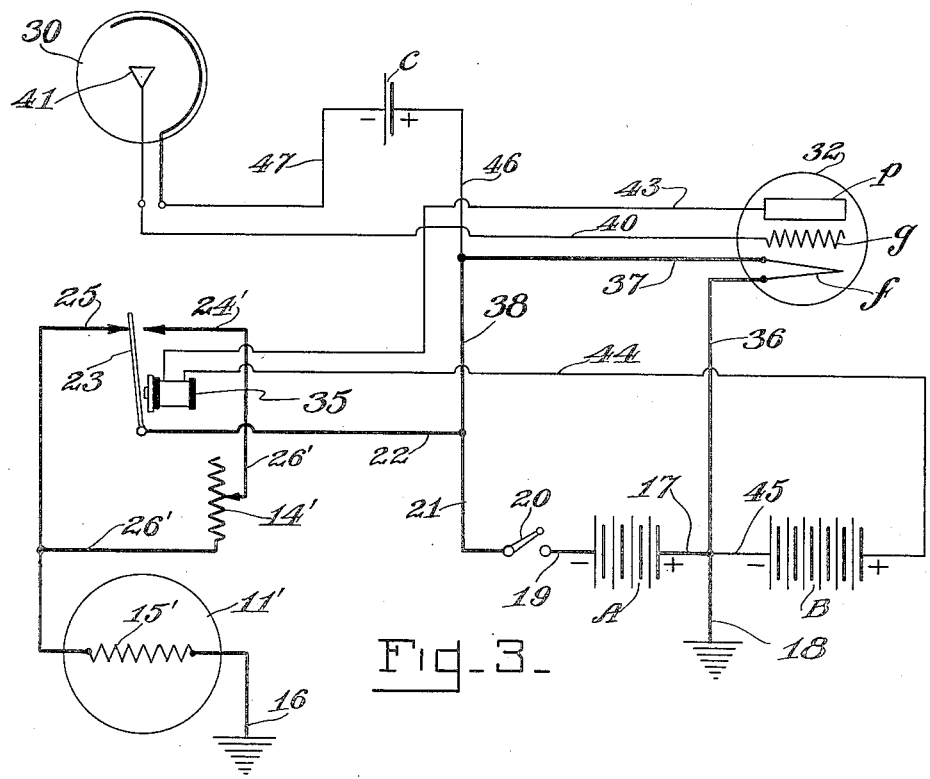

The invention will be more clearly understood from the following description in conjunction with the accompanying drawings; in which Fig. 1 is an elevational view of a portion of an automobile body embodying the invention;

Fig. 2 is a view of the wiring diagram of the lighting system embodying the invention; and Fig. 3 is a view of the wiring diagram of a modified form of lighting system embodying the invention.

An automobile 10 is illustrated in the accompanying drawings having the usual head lamps 11 which are operatively connected with a battery A mounted in the usual manner in the automobile 10. In one embodiment of the invention (Figs. 1 and 2) each head lamp 11 is provided with a lamp filament 15 for giving a dim light. The lamp filament 15 is connected at one end with a grounded conductor 16. The positive terminal of the battery A is connected through a lead 17 to a grounded conductor 18. The negative terminal of the battery A is connected by a lead 19 with a switch 20 which in turn is connected by leads 21 and 22 with a movable switch member 23 adapted to engage either of contacts 24 or 25. The contact 24 is connected by a lead 26 to an intermediate point of lamp filament 15 providing a filament portion 14 for giving a bright light. The contact 25 is connected to the other end of the lamp filament 15 by a lead 27. For convenience, the switch 20 may be located upon the instrument board of the vehicle or on the steering column.

An auxiliary circuit is provided which is adapted to be actuated by the lights of an approaching vehicle. This auxiliary circuit includes a light sensitive device, such as a photo-electric cell 30, mounted in any suitable position upon the vehicle so as to be exposed to the lights of an approaching vehicle. In the embodiment illustrated, the photo-electric cell 30 is mounted upon the head lamp bracket 31. The auxiliary circuit also includes an amplifying tube 32 which may be mounted in any convenient location within the automobile 10 such, for example, as upon a bracket 33 secured to the vehicle dash inside the cowl. An electrically operable device, such as an electromagnet or magnetic relay 35 also is included in the auxiliary circuit and, for convenience, may be mounted on the bracket 33. The relay 35 is of the retarding type in which the coil or a portion thereof is surrounded by a copper ring which acts as a closed secondary winding tending to retard the building up or breaking down of the magnetic flux. The switch, which includes the contacts 24 and 25 and the associated switch 23, also is mounted on the bracket 33 adjacent the device 35 so that the latter may control the movement of the arm 23 to move it from one of the contacts 24 or 25 to the other.

As illustrated in Fig. 2, the filament $f$ of the amplifying tube 32 is operatively connected with the battery A by a lead 36 connected with the lead 17 and by leads 37 and 38 connected with the lead 21. The grid $g$ of the amplifying tube 32 is connected by a lead 40 with the anode 41 of the photo-electric cell 30. A lead 43 connects the plate $p$ with the electro-magnet 35 which, in turn, is connected by a lead 44 with the positive terminal of a battery B, the negative terminal of which is connected by a lead 45 with the lead 36, which is connected with the filament $f$. The cathode of cell 30 is connected by a lead 47 with the negative terminal of the battery C, while the positive terminal of the latter is connected by a lead 46 with the lead 37.

The battery B may be arranged to put any desired suitable positive potential upon the plate $p$ and may have a voltage of about 90 volts. It may be located in any convenient location within the automobile 10. The C battery may be arranged to put any desired suitable negative potential upon the grid $g$ and may have a voltage of about 4 volts. In the embodiment illustrated, the batteries B and C are positioned under the operator's seat. The electro-magnet 35 may be one arranged to be operated by any desired current, such as a current of approximately 5 to 10 milliamperes.

Normally, the switch arm 23 is in engagement with the contact 25 so as to close the circuit from the battery A through the lamp filament 15 when the switch 20 is closed to light the head lamps. When the light rays of the head lamps of an approaching vehicle strike the photo-electric cell 30, the auxiliary circuit is energized to actuate the electro-magnet 35 to move the switch arm 23 from the contact 25 to the contact 24 and thereby close the circuit from the battery A through the lamp filament 14 and furnish a dim light in the head lamps. It will be understood that the auxiliary circuit is adjusted with respect to the intensity of the dim light produced by the lamp filament 14 so that the light produced from the corresponding light filament of an approaching vehicle is sufficient to energize the auxiliary circuit. When the relay 35 is energized a magnetic flux is set up which holds the switch arm 23 in engagement with contact 24 for a few seconds after the auxiliary circuit is deenergized. This prevents the lamps of a vehicle embodying the invention being changed from dim to bright when meeting a line of vehicles closely following one another with the resulting annoyance to the drivers thereof.

It should be noted that when two vehicles approach within a certain distance, the bright lights of each act to dim one another. In the absence of the provision of the present invention, the lights of each would return immediately to bright. However, the action of the retarding relay delays their return to bright for a few seconds to allow the vehicles to come near to each other or to such a distance that the dim lights of each are sufficient to maintain the lights of one another dim.

The arrangement illustrated in Fig. 3 is similar to that shown in Fig. 2 except that the lamp 11' is provided with a single filament 15' and a resistance 14' is connected in the lead 26' connecting the lamp filament 15' with the contact 24'.

I claim:—

1. In an automobile having a lamp with a light filament, a source of electrical energy, an electrical circuit from said source to said filament including a switch, the combination therewith of an auxiliary electrical circuit including a light sensitive device adapted when exposed to light of predetermined intensity to energize said auxiliary circuit, said auxiliary circuit including a device adapted to move said switch from one position to a second position and hold the same in said second position a predetermined length of time after said auxiliary circuit is deenergized.

2. In an automobile having a head lamp, a source of electrical energy, electrical circuits for energizing said head lamp to provide a bright or dim light, said circuits including a common switch normally held in a position to close the circuit to provide a bright light, the combination therewith of an auxiliary electrical circuit including an electrically operable device adapted to actuate said switch to connect the other of said first mentioned circuits with said source, said auxiliary circuit including also a light sensitive device adapted when exposed to light to close said circuit to operate said switch, and means associated with said electrically operable device for causing delay in the return of said switch to its normal position when said auxiliary circuit is deenergized.

WILLIAM F. WRIGHT.